US010514959B2

(12) United States Patent
Sato

(10) Patent No.: US 10,514,959 B2
(45) Date of Patent: Dec. 24, 2019

(54) DISTRIBUTED VIRTUAL LOCAL OPERATING SYSTEM STORED IN CLOUD AND ITS METHOD

(71) Applicant: SAMSUNG ELETRÔNICA DA AMAZÔNIA LTDA., Manaus-Am (BR)

(72) Inventor: Paulo Vitor Sato, Campinas (BR)

(73) Assignee: SAMSUNG ELECTRONÔNICA DA AMAZÔNIA LTDA., Campinas-São Paulo (BR)

( * ) Notice: Subject to any disclaimer, the term of this patent is extended or adjusted under 35 U.S.C. 154(b) by 0 days.

(21) Appl. No.: 14/141,979

(22) Filed: Dec. 27, 2013

(65) Prior Publication Data
US 2014/0282535 A1   Sep. 18, 2014

(30) Foreign Application Priority Data
Dec. 28, 2012  (BR) .......................... 1020120338262

(51) Int. Cl.
*G06F 9/46* (2006.01)
*G06F 9/50* (2006.01)
*G06F 9/455* (2018.01)

(52) U.S. Cl.
CPC ........ *G06F 9/5072* (2013.01); *G06F 9/45558* (2013.01); *G06F 2009/4557* (2013.01)

(58) Field of Classification Search
CPC .............. G06F 9/5072; G06F 9/45558; G06F 2009/4557
See application file for complete search history.

(56) References Cited

U.S. PATENT DOCUMENTS

| | | | |
|---|---|---|---|
| 7,457,951 B1 * | 11/2008 | Proudler | G06F 21/566 713/164 |
| 8,954,876 B1 * | 2/2015 | Hobbs | G06F 9/452 715/772 |
| 2006/0005186 A1 * | 1/2006 | Neil | G06F 9/4555 718/1 |
| 2011/0265076 A1 * | 10/2011 | Thorat | G06F 8/65 717/172 |
| 2011/0302243 A1 * | 12/2011 | Ashcraft et al. | 709/203 |
| 2013/0268575 A1 * | 10/2013 | Xu | G06F 3/048 709/202 |
| 2013/0324245 A1 * | 12/2013 | Harvey | A63F 13/49 463/31 |
| 2015/0116310 A1 * | 4/2015 | Baudouin | G06F 9/44 345/419 |

* cited by examiner

*Primary Examiner* — Camquy Truong

(57) ABSTRACT

The present invention describes a distributed operating system that allows any local operating system to run more than one cloud-hosted virtual machine. The described system uses three different server clusters: one for storing, one for general processing and other for image processing. The processed image is sent to the user over the network, all the user needs is a screen to display the final image and an input terminal as a touch screen or a mouse and keyboard.

9 Claims, 4 Drawing Sheets

DISTRIBUTED VIRTUAL LOCAL OPERATING SYSTEM STORED IN CLOUD AND ITS METHOD

CROSS-REFERENCE TO RELATED APPLICATIONS

This application claims the priority benefit of the Brazilian Patent Application No. 1020120338262, filed on Dec. 28, 2012 in the Brazil National Institute of Industrial Property, the disclosure of which is incorporated herein by reference for all purposes.

FIELD OF THE INVENTION

The present invention relates to a distributed operating system that allows any local operating system to run more than one cloud-hosted virtual machine. The described system uses three different server clusters: one for storing, one for general processing and other for image processing. The processed image is sent to the user over the network, all user needs is a screen to display the final image and an input terminal as a touch screen or a mouse and keyboard.

BACKGROUND OF THE INVENTION

The rapid development of hardware becomes obsolete the new models very quickly. This makes users spend too much money on new hardware frequently. The hardware requirement to run software gets bigger every moment, and there is a big gap between computing power of desktop and other devices.

In the near future, there will be multiple devices to be connected to the Internet, devices such as TV, tablet, microwave, smartphones, and maybe even a window that can act as a monitor. These different devices can run different operating systems, thereby making it very difficult to integrate them all.

A user will have multiple devices, such as tablets and smartphones, he will want to have the same operating system on all of them, and he will also want that all his devices be connected uniformly as a single system.

In the document Nivio (http://ch.nivio.com/): Nivio is an operating system based in the cloud that performs a commercially operating system, but to support its cloud environment, all applications must be modified by the user or company that uses it. Another point is that Nivio is run through a web browser, so there will be another operating system running the browser. The system of the present invention needs to modify any application, since it is run through a virtual machine and since the system will only send the rendered video, without needing another complete operating system running on the device.

The patent document U.S. Pat. No. 8,069,242 B2, published on Nov. 29, 2011, discloses a method for integrating cloud computing systems, employing only a cloud computing system to avoid delays between the general data processing, data storage and graphical rendering.

The document US 20030105810, published on Jun. 5, 2003, offers a server manager in the cloud to control logical servers and physical resources that constitute a cloud of virtualized logical server.

The document US 20120011190 A1, published on Jan. 12, 2012, created a cloud broker to receive requests for processing resources of a plurality of cloud management infrastructure and to find out what cloud can complete the request, being the request sent to the cloud that can complete it.

The document US 20120072579 A1, published on Mar. 22, 2012, shows a monitor to a system in the cloud that monitors the runtime operations in the cloud asynchronously. This monitor can create, grow and diminish the cloud deployment.

The present invention overcomes the shortcomings of the state of the art, since it does not aim to propose a new infrastructure for the control or monitoring of a cloud deployment, but a specific infrastructure for a virtual operating system that runs more than one cloud computing system that renders the image in the cloud.

SUMMARY OF THE INVENTION

The present invention proposes a method to run a virtual machine with variable configuration. What, therefore, causes the user can update, if necessary, a virtual machine running in a cloud environment. The terminal connected to this system will receive the image already rendered so there is no need of having terminals with strong processing power, thus allowing the user to run software with requirements of high processing power in many different terminals, with low processing power. This invention also provides that the same operating system to run on several different devices, allowing a perfect connection with all these devices.

BRIEF DESCRIPTION OF THE DRAWINGS

The objectives and advantages of the invention will become more apparent from the following detailed description of non-limiting figures, wherein.

DETAILED DESCRIPTION OF THE INVENTION

New Features of the Invention

To provide continuous access to an operating system using several different devices, the system of the present invention is run in a cloud. In the context of the present invention, cloud is a set of servers that run a service set, in this case a virtual machine. These servers are invisible to the user, and he will see only one service, as if only one server was working.

The proposed architecture has all the components in a personal computer, i.e., processor, hard drive and graphics rendering hardware, but separated in independent clouds and meeting in the virtual machine server.

The cloud of the graphics processing unit (GPU) in the context of the present invention is a hardware to render images. This cloud will perform parallel processing of frames, and send them to a server that requests them and then send them through the Internet using a protocol such as the Wi-Di.

A virtual machine that converts a cloud-based environment to emulate a standard personal computer.

Advantages of the Invention

The system of the present invention can be run on any device with a screen that has any type of input. It allows all your devices can have the same operating system, with all its data. In the future where almost all appliances of a house will be connected to the internet and this will allow running your personal operating system anywhere.

The need for computing power grows very quickly, and is very expensive to maintain an updated hardware, with this system. Thus, the user will only need to hire more computing power, so there is no need to change all your hardware.

This system performs a virtual machine in a cloud environment, so there is no need to modify any application to use this system, just install it like a normal operating system does. The user can turn any device connected to this system on a monitor, and thus the user can watch a movie or make a presentation on a TV or a projector and using his mobile device as he can control the presentation as if it were connected to the same physical device. According to embodiments of the present invention, there is an array of servers in the cloud that will only perform graphics processing (GPU). Thus, only the image will be sent to the device that allows the device to have the computing power very limited, just needed to display the image.

Figure 1:
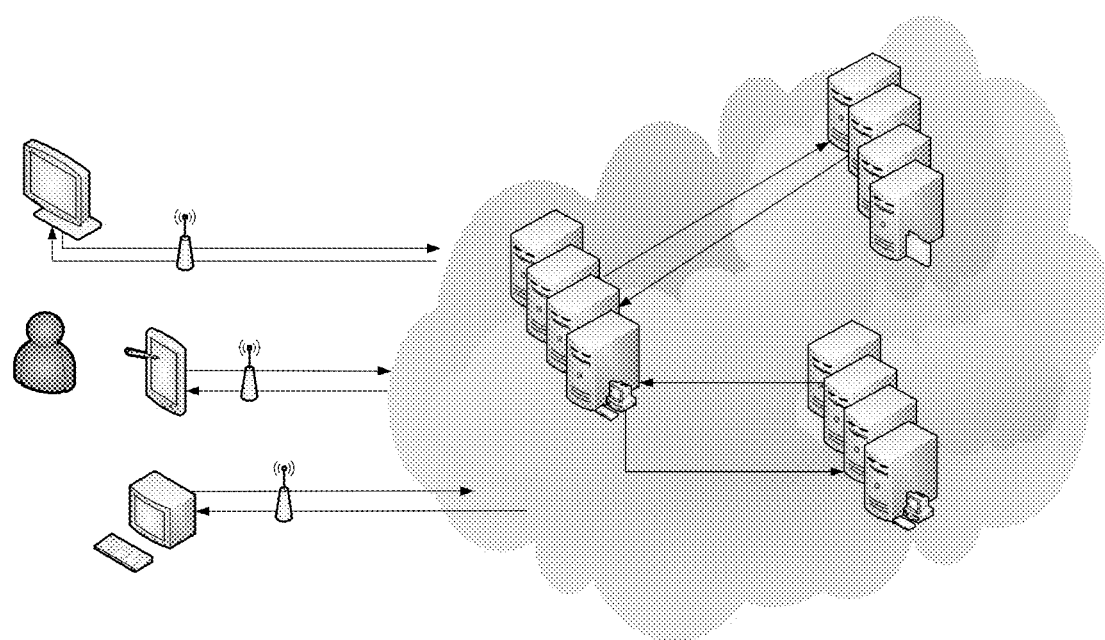
FIG. 1 shows a view of the user of the system, in which the user views the entire system as a single cloud.
Figure 2:
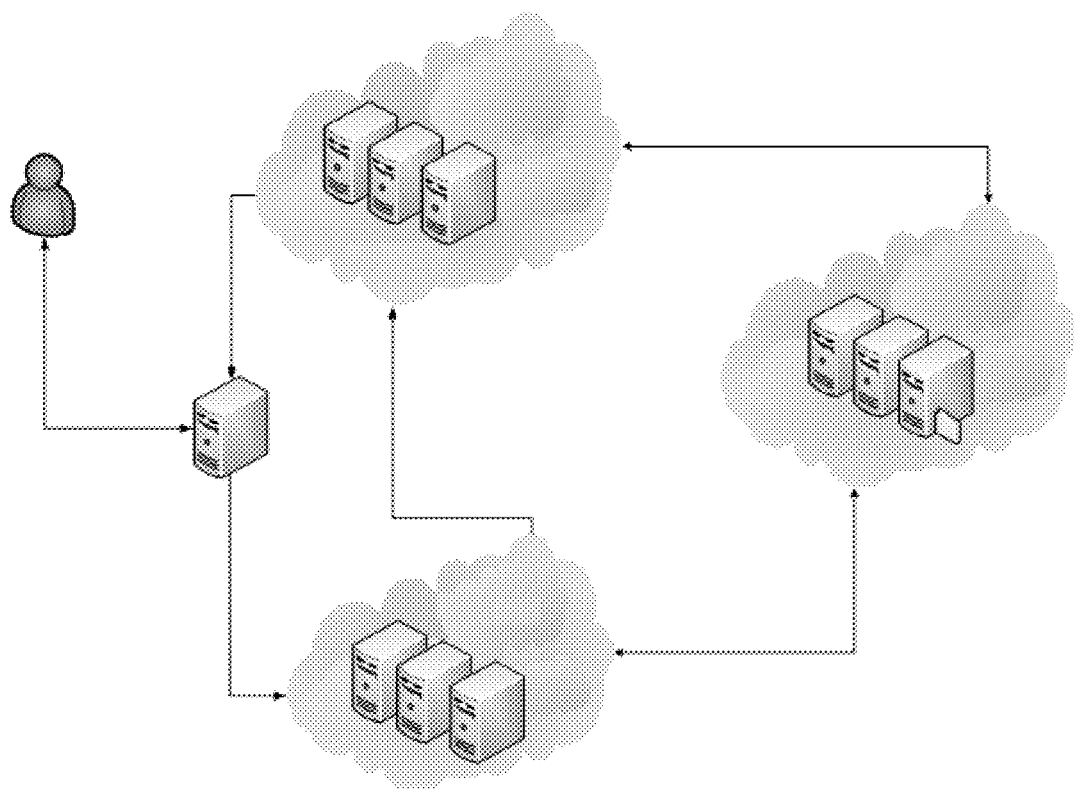
FIG. 2 presents an overview of the system architecture, with three separate clouds that communicate with each other.

As shown in FIGS. 1 and 2, the proposed system in the present invention is a distributed operating system that runs on a cloud. This system will have three main different types of servers: general data processing, data storage and graphics rendering. As shown in FIGS. 1 and 2, there are also server functions as a border agent, which receives user input shown in FIG. 4 and redirects it towards the entrance of the data processing cloud. All communications between clouds use a protocol such as IP. However, the present invention is not limited to it and many others known or to be developed protocols can be used for such communication.

The distributed system was originally designed to run Web-based application that runs in a browser over another operating system. The proposed system will run entirely in the cloud, which includes graphics rendering, which is usually done at the terminal. Therefore, all processing is done on a mainframe, which has much more computational power than a single PC or a mobile device. To achieve this, the proposed system will create a virtual machine for the operating system designed, such as Windows in the Intel 8086_64 architecture, which is the preferred architecture, in accordance with the preferred embodiment of the present invention, but is not limited to this architecture. The virtual machine will create an abstraction layer so that the operating system does not recognize that is running on a cloud. The regular server virtualization is done to be able to perform various tasks of the operating systems on the same server. But in this case the virtual machine will be implemented to make an operating system running on multiple servers at the same time.

To render the image, the graphics rendering cloud will have a programming line for each operating system. The data to be processed is sent to an idle GPU that will process a frame and send it to the virtual machine server. The virtual machine will treat the image as a stream, if the frame is the following frame, which will be sent to the user along with each continuous picture stored temporarily, if not he will temporarily store this frame. Once the frame rendering can be done in parallel, this system could offer the best possible performance by sending 30 different frames to render in 30 different GPUs. The big advantage is that processing power can be quickly increased only by increasing the amount of GPU, not being necessary for the end user to buy another GPU. The most powerful GPU which is currently manufactured can generate a frame for the heaviest game in 20 milliseconds, the best image quality is obtained, showing 60 frames per second, if up 30 GPU work in parallel, 30 frames will be generated in 20 milliseconds more the network delay. That's still less than 0.5 s. Therefore, for the user, this operation will be imperceptible.

The processed output is sent from the virtual machine server to the user through the network using a protocol such as Wi-Di (Wireless HD), but not limited to it, via a high-speed network, the terminal running the system only has to show the data as any monitor or TV with an HDMI cable would. This approach makes it possible to run the heavy processing of images in real time with devices that have low processing power and rendering capabilities of downtown image, like playing a shooter game on a mobile device. This is different from any current technology, since the image rendering is always limited to the device that is showing the communication means.

This would work almost like a remote desktop, but much faster because there is no need to spend time running the operating system itself. When a user registers with another device, he can choose to connect to mirrored desktop system or create a new desktop, just like when another monitor is plugged into Microsoft Windows®. This way, it is possible to have any number of instances of the same virtual desktop. In this case, it could replicate the same screen or have another just for some use cases, something like watching a movie on TV and talking to a friend using a dialer on your tablet, or controlling the movie. The user can upload files to the system using the same network, since the transfer of files can consume a lot of bandwidth, it should have a quality service to ensure a large enough bandwidth to transfer image so that the image quality does not fall.

Another great advantage of the present invention is that it is not necessary to buy a new computer to a new game. The user only needs to hire more processing power provider, keeping the same screen, mouse and keyboard.

The system of the present invention has been designed thinking in a world where everything is connected to internet, and bandwidth is not an issue (Wi-Di was designed to run on a network of 1 Gbit). This would be a system that user can use on your window, your refrigerator, your cell phone, your monitor and everything that is connected to the internet and has a form of input.

Normal operation: the first step is the user login, the user authenticates, and then is redirected to a virtual machine server. That server is the server closest to the user, so that the latency of the network is minimized.

Figure 3:
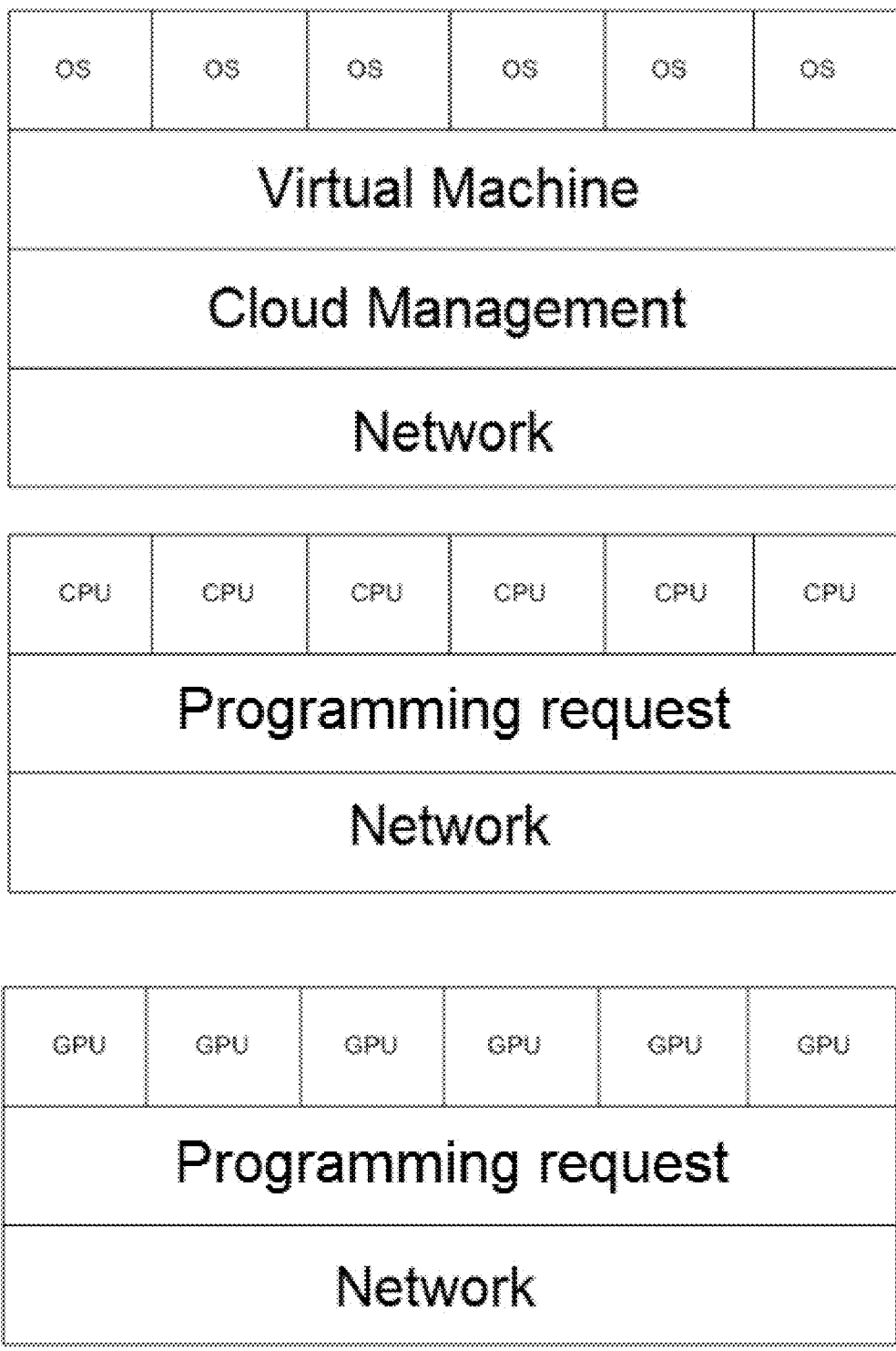
FIG. 3 shows the overview of the architecture of each cloud and the virtual machine server.

The virtual machine server will begin processing as shown in FIG. 3, then several instructions will be sent to the cloud processing, the instruction set will be close to a pipeline processor.

Figure 6:
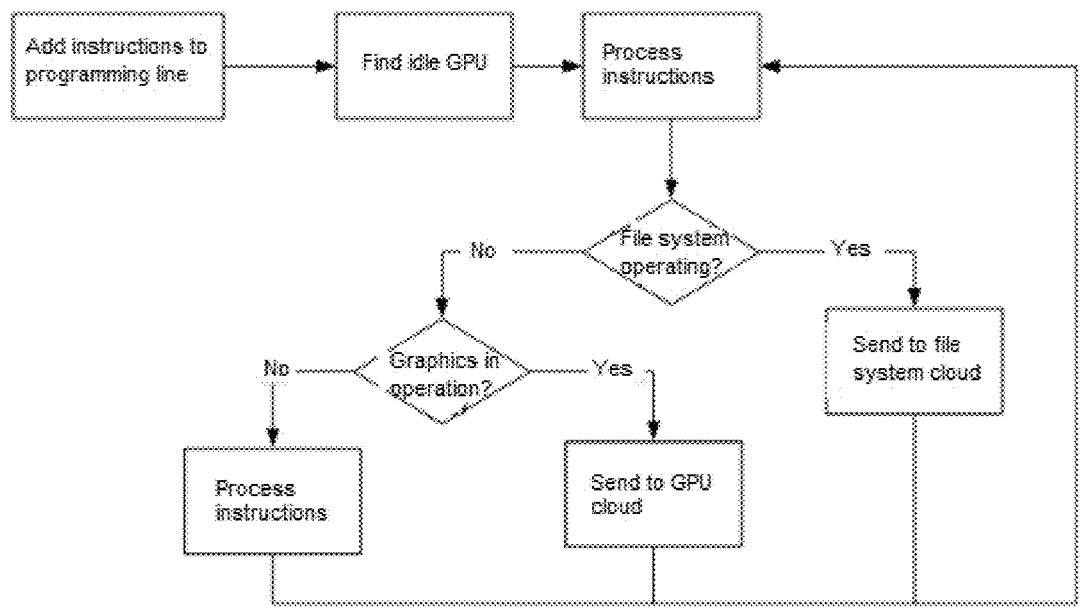
FIG. 6 shows a block diagram depicting the method for the cloud of the Central Processing Unit.
Figure 7:
FIG. 7 shows a block diagram depicting the method for the cloud of the graphics processing unit.

If there is not an output image instruction, data to be rendered will be sent to the GPU cloud as shown in FIG. 6. GPU cloud will find several idle GPU and send them a frame to be processed, the rendered frame is sent to the server of the virtual machine as shown in FIG. 7.

Figure 4:
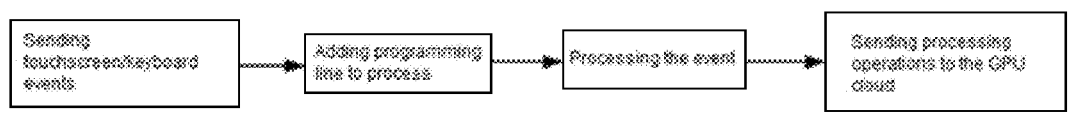
FIG. 4 shows a block diagram depicting the method for sending an input event to the system.
Figure 5:
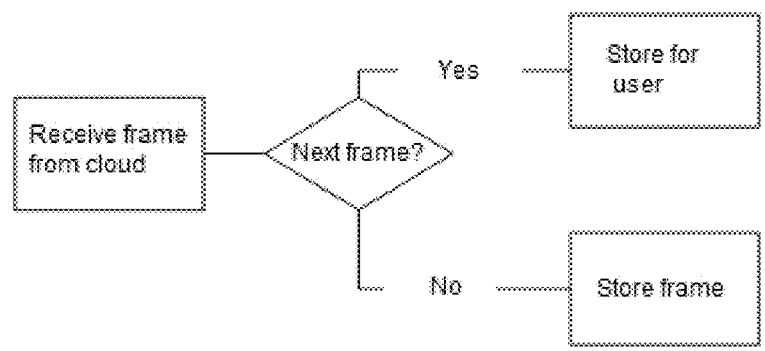
FIG. 5 shows a block diagram depicting the method of the virtual machine server for sending frames to the user's device.

The server virtual machine will receive the frames and treat them as a stream, the frame that has arrived is the next that will send it to the user along each sequential frame temporarily stored, if not he will temporarily store the same, as shown in FIG. 4.

As the user interacts with the system, the device sends incoming events to the virtual machine server, as shown in FIG. 4.

The example cases of use for the system of the present invention are:

a) A user who wants to watch a full HD movie (1080p) on your tablet, but the tablet has low processing power and therefore cannot process the film. With the proposed system, the actual processing occurs within the cloud, only the rendered output is transferred to the tablet, that just need to show said rendered output.

b) The user needs great computing power for a particular game, this game would be installed in the distributed operating system. The player with a mouse and keyboard or a joystick connected to a screen, like a TV, monitor, projector, or even a refrigerator could play the game since it was processed in the cloud.

c) The user will make the presentation. He comes to the location of that presentation with a tablet and starts the distributed operating system of the present invention. He adds the projector as a monitor connected to the system, after a few seconds the projector shows the user's desktop. The user opens a slideshow program on the tablet, such as Microsoft PowerPoint®, and begins his presentation on the projector. In the presentation, he can, for example, draw upon his slides and the entire drawing is displayed on the projection.

d) Assuming a user with household appliances, such as but not limited to, TV, refrigerator or even windows that are connected to the internet and has the ability to display images with some kind of input, such as mouse, keyboard, touch screen, or even windows that act as a touch screen monitor. After awakening, the user connects the window as a monitor, which connects to the proposed system, showing the desktop. The user then opens a music player and starts playing a song, the window is connected to the sound system of room for the music to be played. The user moves to the kitchen, where he will start making breakfast, there he connects to the proposed system using the refrigerator. When he turns on, the sound that is playing in the refrigerator and in the room, he remotely turns off the windows system and continues to have breakfast. After finishing breakfast, he shuts down the system and goes to work, where he will have access to his personal operating system via his cell phone.

Although a preferred embodiment of the present invention has been shown and described, those skilled in the art will appreciate that various modifications can be made without departing from the scope and spirit of the invention as defined in the appended claims.

It is also expressly stated that all combinations of elements that perform the same function substantially in the same way to achieve the same results are within the scope of the invention.

The invention claimed is:

1. A distributed virtual local operating system comprising:
    a local display configured to receive an input from a user, transmit the received user input, receive a remotely generated rendered image, and display the received remotely generated rendered image;
    a remote general data processing server configured to receive the user input, perform data processing based on the received user input, and transmit and receive processing data;
    a remote data storage server configured to receive the processing data transmitted from the remote general data processing server, store the received processing data, and transmit the processing data to the remote general data processing server; and
    a remote graphics rendering server including a respective programming line for each operating system among a plurality of operating systems and configured to receive the user input, transmit the received user input to the remote data processing server, receive the processing data transmitted from the remote general data processing server, generate and render the remotely generated rendered image to be displayed on the local display based on the received processing data, and transmit the remotely generated rendered image to the local display.

2. The distributed virtual local operating system according to claim 1, wherein all the transmit and receive communication uses Internet Protocol.

3. A method characterized by working according to the cloud stored distributed virtual local operating system as defined in claim 2.

4. The distributed virtual local operating system according to claim 1, wherein the distributed virtual local operating system is run entirely in the cloud, and all processing is done on a mainframe.

5. A method characterized by working according to the cloud stored distributed virtual local operating system as defined in claim 4.

6. The distributed virtual local operating system according to claim 1, wherein the processed output is sent from the virtual machine server to the user through the network using W-Di (wireless HD), and the terminal running the system only has to display the data.

7. A method characterized by working according to the cloud stored distributed virtual local operating system as defined in claim 6.

8. A method characterized by working according to the cloud stored distributed virtual local operating system as defined in claim 1.

9. An apparatus comprising:
    a local display configured to:
        receive an input from a user,
        transmit the received user input to a remote general data processing server configured to receive the user input, perform data processing based on the received user input, and transmit and receive processing data,
        receive a remotely generated rendered image from a remote graphics rendering server including a respective programming line for each operating system among a plurality of operating systems and configured to receive the user input, transmit the received user input to a remote data processing server configured to receive the processing data transmitted from the remote general data processing server, store the received processing data, and transmit the processing data to the remote general data processing server, receive the processing data transmitted from the remote general data processing server, generate and render the remotely generated rendered image to be displayed on the local display based on the received processing data, and transmit the remotely generated rendered image to the local display, and display the received remotely generated rendered image.

* * * * *

UNITED STATES PATENT AND TRADEMARK OFFICE
CERTIFICATE OF CORRECTION

PATENT NO.        : 10,514,959 B2
APPLICATION NO.   : 14/141979
DATED             : December 24, 2019
INVENTOR(S)       : Paulo Vitor Sato et al.

Page 1 of 1

It is certified that error appears in the above-identified patent and that said Letters Patent is hereby corrected as shown below:

On the Title Page

Item (73), In the Assignee information, after "SAMSUNG" delete "ELECTRONÔNICA" and insert -- ELETRÔNICA --, therefor.

Signed and Sealed this
Eighteenth Day of February, 2020

Andrei Iancu
*Director of the United States Patent and Trademark Office*